(No Model.) 5 Sheets—Sheet 1.
H. W. LANGSCHMIDT & R. F. LE BROCQ.
STATION INDICATOR FOR TRAMWAY OR OTHER CARS.
No. 588,701. Patented Aug. 24, 1897.
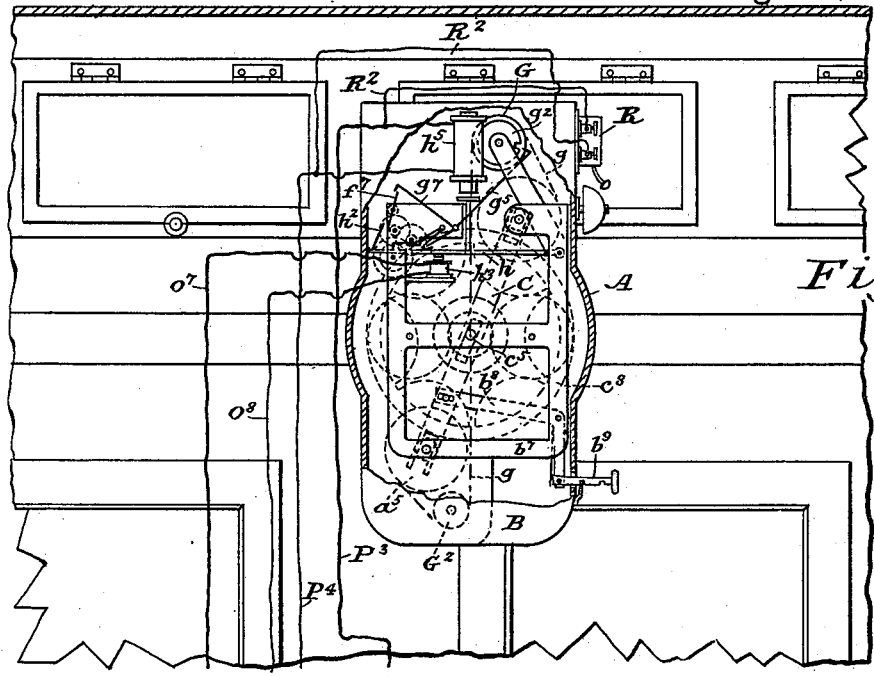
Fig. 1.
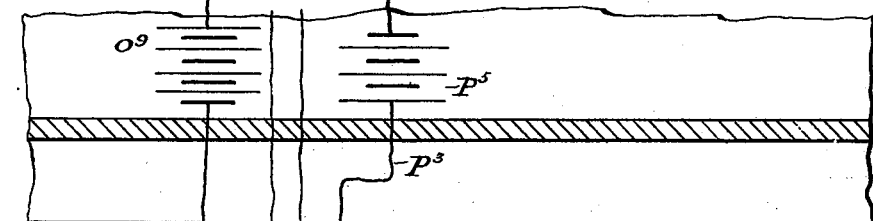
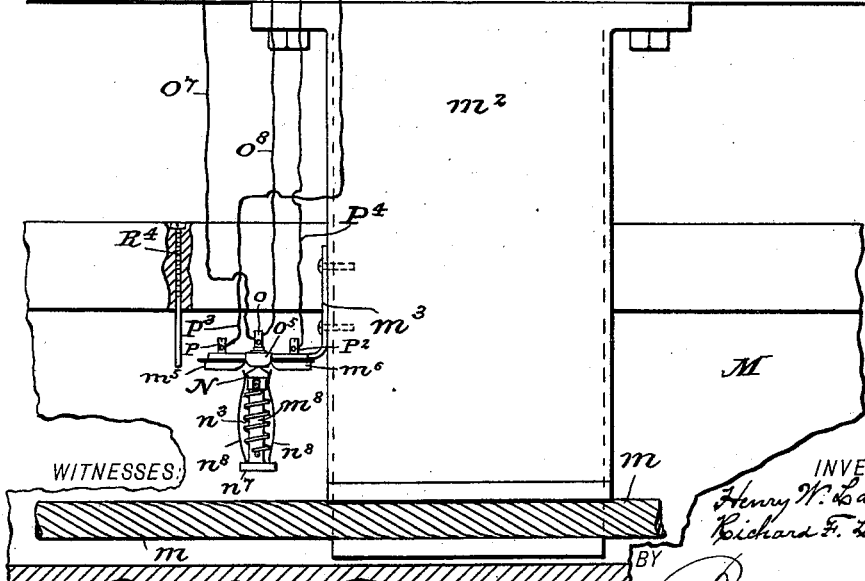
WITNESSES:
INVENTORS:
Henry W. Langschmidt
Richard F. Le Brocq
BY
ATTORNEYS (No Model.) 5 Sheets—Sheet 2.
H. W. LANGSCHMIDT & R. F. LE BROCQ.
STATION INDICATOR FOR TRAMWAY OR OTHER CARS.
No. 588,701. Patented Aug. 24, 1897.
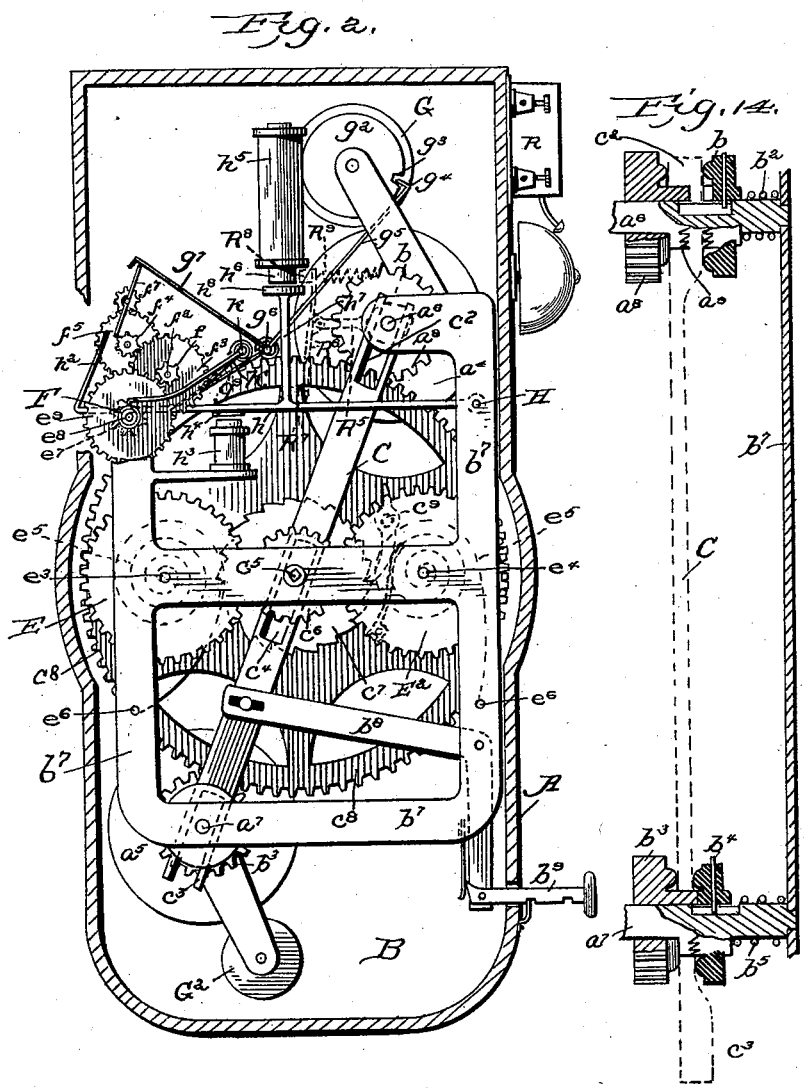

(No Model.) 5 Sheets—Sheet 3.
H. W. LANGSCHMIDT & R. F. LE BROCQ.
STATION INDICATOR FOR TRAMWAY OR OTHER CARS.
No. 588,701. Patented Aug. 24, 1897.
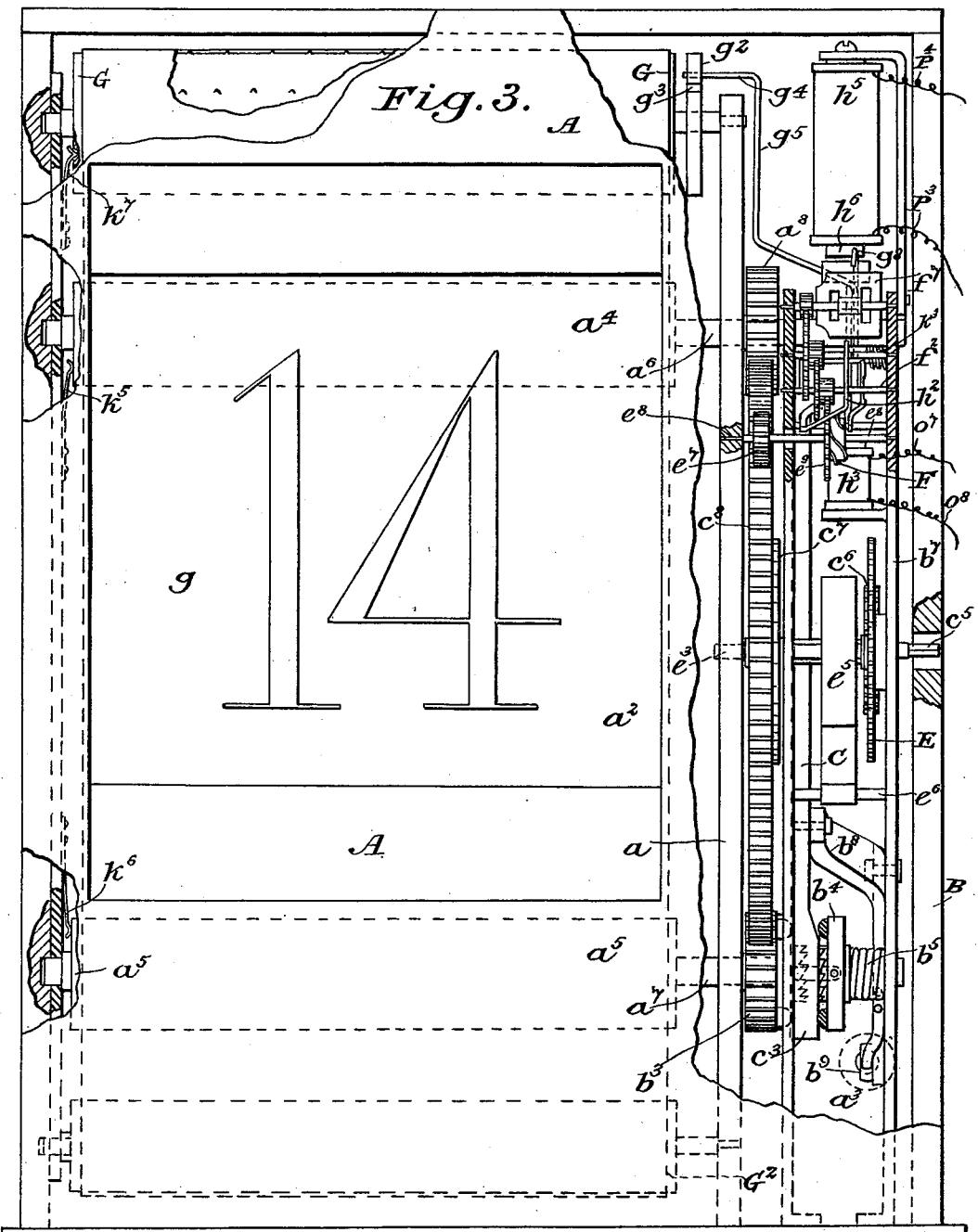
WITNESSES:
E. B. Bolton
E. A. Scott
INVENTORS:
Henry W. Langschmidt
Richard F. Le Brocq
BY Richard
ATTORNEYS

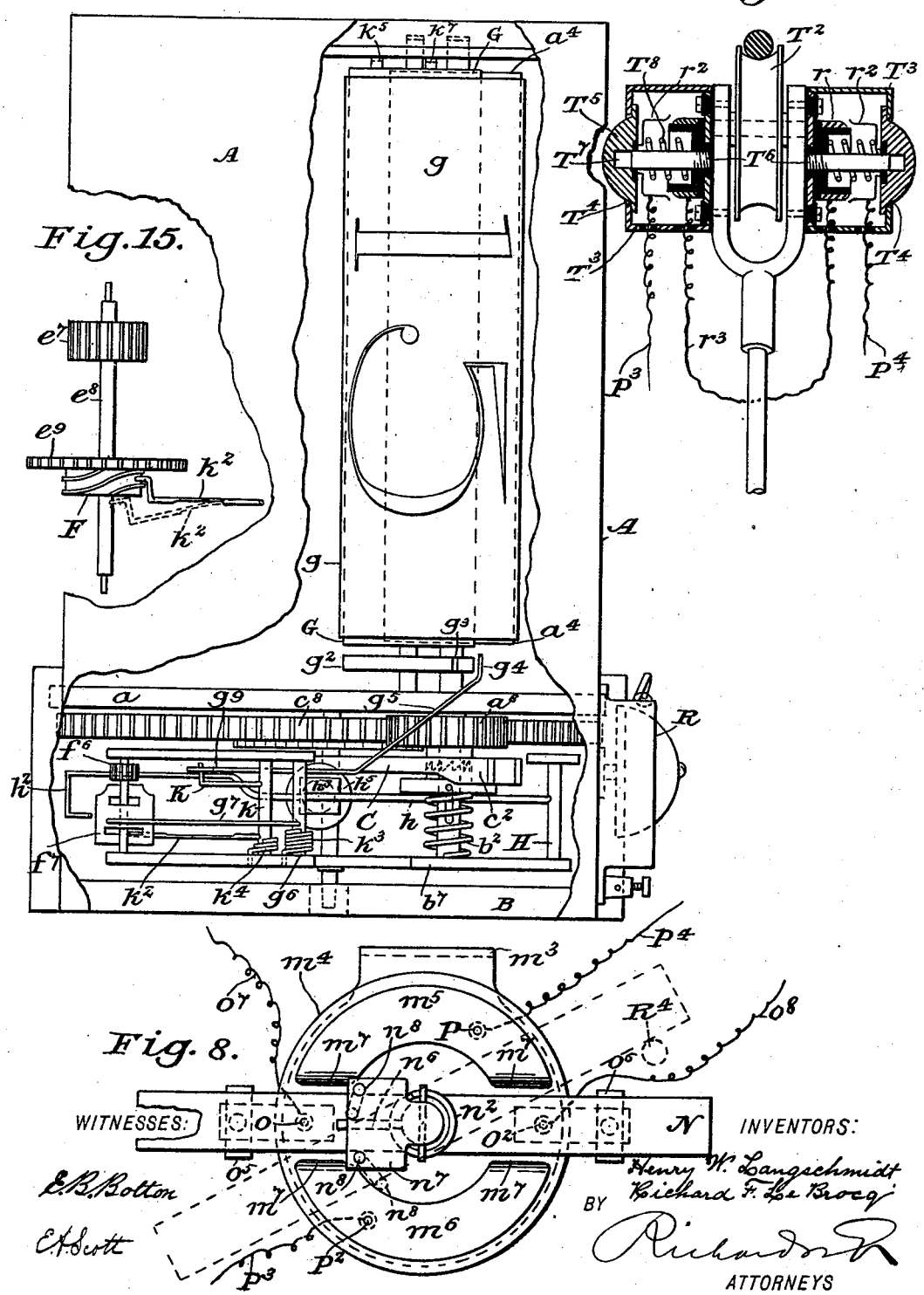

(No Model.) 5 Sheets—Sheet 5.
H. W. LANGSCHMIDT & R. F. LE BROCQ.
STATION INDICATOR FOR TRAMWAY OR OTHER CARS.
No. 588,701. Patented Aug. 24, 1897.
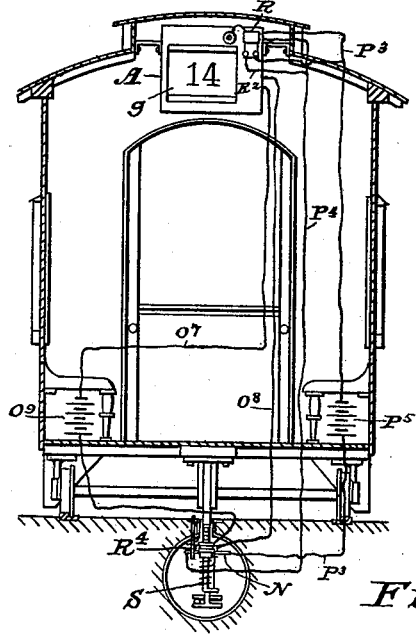
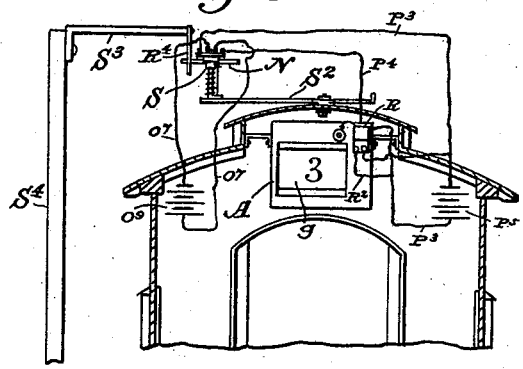
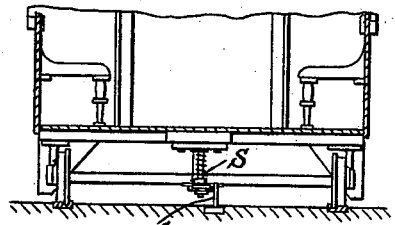
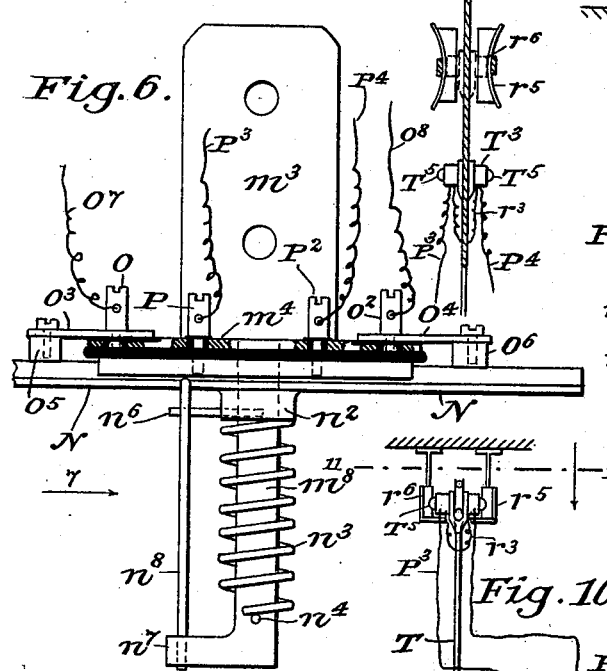
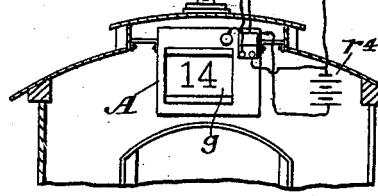
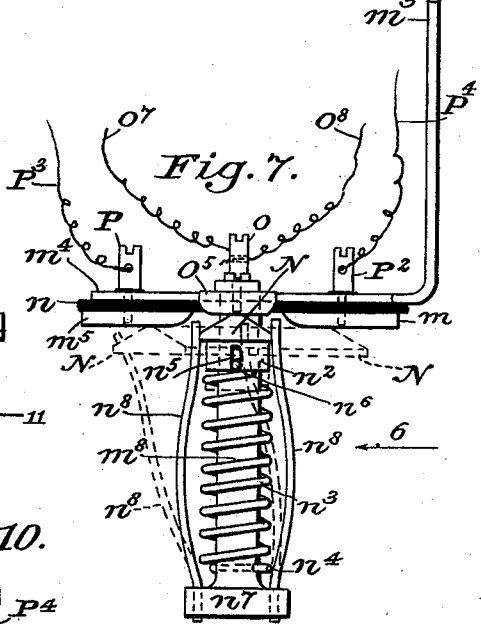
WITNESSES:
E. B. Bolton
E. A. Scott
INVENTORS:
Henry W. Langschmidt
Richard F. Le Brocq
BY Richard
ATTORNEYS

UNITED STATES PATENT OFFICE.

HENRY W. LANGSCHMIDT, OF BROOKLYN, AND RICHARD F. LE BROCQ, OF NEW YORK, N. Y., ASSIGNORS OF ONE-THIRD TO JAMES P. NIEMANN, OF NEW YORK, N. Y.

STATION-INDICATOR FOR TRAMWAY OR OTHER CARS.

SPECIFICATION forming part of Letters Patent No. 588,701, dated August 24, 1897.

Application filed October 16, 1896. Serial No. 609,134. (No model.)

*To all whom it may concern:*

Be it known that we, HENRY W. LANGSCHMIDT, residing at Brooklyn, in the county of Kings, and RICHARD F. LE BROCQ, residing at New York, in the county of New York, State of New York, citizens of the United States, have invented certain new and useful Improvements in Station-Indicators for Use on Tramway or other Cars, of which the following is a specification, such as will enable those skilled in the art to which it appertains to make and use the same.

The invention is fully disclosed in the following specification, of which the accompanying drawings form a part, in which like letters and numerals of reference designate similar or equivalent parts wherever found throughout the several views, and in which—

Figure 1 is a longitudinal vertical section of a part of a tramway cable-car and also a part of the conduit, showing our improved station-indicator connected therewith and means for operating the same. Fig. 2 is a sectional end view of the box containing the station-indicating mechanism on an enlarged scale; Fig. 3, a front or side view of said box, part of the casing being broken away and part of the construction being shown in section; Fig. 4, a plan view of said box with a part of the casing broken away to better show the construction; Fig. 5, a cross-section of the car and conduit shown in Fig. 1 on a reduced scale; Fig. 6, a front view of the operating-switch with its attachments, which is connected with the cable-grip and moves therewith within the conduit; Fig. 7, a side view thereof; Fig. 8, a plan view thereof; Fig. 9, a cross-section of the upper part of a car provided with our improved station-indicator, showing the method of operating the indicator by means of overhead devices, the style of car being either a tramway or steam car; Fig. 10, a similar view showing our improvement applied to a trolley-car; Fig. 11, a section on the line 11 of Fig. 10; Fig. 12, a similar view of the bottom part of a car, showing a method of operating the station-indicator by means of a device or devices connected with the ground between the rails of the track; Fig. 13, a sectional view of the construction shown in Fig. 10, and Figs. 14 and 15 represent sectional and detail views of the construction employed.

In the practice of our invention we provide a suitable station-indicating box containing operative mechanism under the control of a suitable electrical device, and these devices are adapted to operate in connection with a cable-car, a trolley-car, or any form of tramway or steam car, and in the drawings forming part of this specification we have shown several methods of operating the mechanism of the station-indicating box.

In Figs. 1, 2, 3, 6, and 7 we have shown our improvement applied to a cable-car, although all the features of construction shown in these figures which relate to the operating mechanism of the station-indicating box or casing are also applicable to other forms of cars and are substantially the same whether the car be a cable-car, a trolley-car, a steam-car, or horse-car.

The station-indicating box or casing which we employ is shown at A in Figs. 1, 2, 3, and 4, and also in Figs. 9 and 10, and this box or casing may be of any desired form and may be placed in the car in any desired position, either at the one end thereof or centrally therein, and in Fig. 1 we have shown it suspended from the central portion of the car. An end view of this box or casing is shown in Figs. 1 and 2, the view in Fig. 2 being on an enlarged scale, and in each of these figures the end of the box or casing is removed so as to show the operating mechanism therein.

The box or casing A is provided adjacent to one end thereof with a vertical partition-plate $a$, by which a large compartment $a^2$ and a small compartment $a^3$ are formed, and in the upper part of the larger compartment $a^2$ and adjacent to the one side of the box is mounted a roller $a^4$, and a corresponding roller $a^5$ is mounted in the lower part of said compartment and near the opposite side thereof.

The shaft $a^6$ of the roller $a^4$ and the shaft $a^7$ of the roller $a^5$ extend through the smaller chamber $a^3$, and revolubly mounted on the shaft $a^6$ is a gear-wheel $a^8$, which is provided on its outer side with a clutch-hub $a^9$, and mounted on the end of said shaft adjacent to the end B of the box or casing is a sliding clutch-head $b$, between which and the end B of the box or case is a spring $b^2$. The shaft $a^7$ of the roller $a^5$ is also provided with a gear-wheel $b^3$, which is revolubly mounted thereon, and which corresponds with the gear-wheel $a^8$ on the shaft $a^6$, and mounted on the end of said shaft $a^7$ is a spring-operated clutch-head $b^4$, which corresponds with the clutch-head $b$ on the shaft $a^6$, and a spring $b^5$ operates the clutch-head $b^4$.

The foregoing construction is best shown in Figs. 3 and 14, and mounted in the smaller chamber $a^3$ adjacent to the end B of the box is an angular frame $b^7$, to one side of which is pivoted a crank-lever $b^8$, to the lower end of which is pivoted a rod $b^9$, which extends through the casing, and the inner end of the crank-lever $b^8$ is pivotally connected with a sliding bar C, which extends diagonally across the box between the shafts of the rollers $a^4$ and $a^5$ and each end of which is forked or bifurcated, as shown at $c^2$ and $c^3$ in Fig. 2, and the ends of said bar or the sides of the fork at each end are wedge-shaped, as shown in Figs. 4 and 14.

The ends of the shafts $a^6$ and $a^7$ pass through the forks at the ends of the bar C, and bar C is provided centrally thereof with a slot $c^4$, through which passes a winding-shaft $c^5$, on which is mounted a pinion $c^6$, and said shaft is also provided with a ratchet-wheel $c^7$.

The pinion $c^6$ and ratchet $c^7$ are secured to the shaft $c^5$, and revolubly mounted on said shaft is a large drive-wheel $c^8$, and connected with said drive-wheel is a spring-operated dog $c^9$, which operates on the ratchet-wheel $c^7$, as shown in Fig. 2.

Mounted on the opposite sides of the pinion $c^6$ are the gear-wheels E and $E^2$, which are mounted, respectively, on the shafts $e^3$ and $e^4$, as shown in Figs. 2 and 3, and on each of these shafts is wound a strong spiral spring $e^5$, both of which are shown in dotted lines in Fig. 2, one of which is shown in full lines in Fig. 3. One end of each spring is secured to its respective shaft and the other end to a rod or support $e^6$.

We also provide a pinion $e^7$, which is mounted on a shaft $e^8$, as shown in Figs. 2, 3, and 15, and adapted to be operated by the drive-wheel $c^8$, and mounted on said shaft is a gear-wheel $e^9$, at one side of which is a hub F, provided with a worm-gear.

The gear-wheel $e^9$ operates a pinion $f$, mounted on a shaft $f^2$, on which is a gear-wheel $f^3$, which operates a pinion $f^4$, on the shaft of which is a gear-wheel $f^5$, which operates a pinion $f^6$, on the shaft of which is a fly $f^7$.

Mounted above the roller $a^4$ and slightly in front thereof is a guide-roller G, and a corresponding roller $G^2$ is mounted below and slightly at the rear of the roller $a^5$, and wound on the rollers $a^4$ and $a^5$ is a strip $g$ of paper or any suitable material on which the numbers or names of the stations on the line are printed or formed.

The rollers G and $G^2$ are simply guide-rollers over which the strip $g$ passes as it is wound from one of the rollers $a^4$ or $a^5$ onto the other in the operation of the device, as hereinafter described, and are not in gear with the other parts of the mechanism hereinbefore described.

Mounted on the shaft of the roller G is a circular disk $g^2$, in the perimeter of which is an angular notch or recess $g^3$, which is designed to receive an angular projection $g^4$, formed on a rod $g^5$, one end of which is secured to a shaft $g^6$, to which is also secured a rod $g^7$, which is provided at its free end with a hook $g^8$, which is adapted to operate in connection with the fly $f^7$. The shaft $g^6$ is also provided with another rod $g^9$, which projects downwardly and rests upon a projection formed at the end of an arm K, secured to a shaft $k$, to which is also secured a spring-arm $k^2$, which operates in connection with the worm-gear on the hub F of the wheel $e^9$, and the shafts $g^6$ and $k$ are provided, respectively, with springs $k^3$ and $k^4$, which normally operate to hold the parts connected therewith in the position shown in Fig. 2.

Secured to the box or frame adjacent to the ends of the rollers $a^4$ and $a^5$, opposite the clutches hereinbefore described, are springs $k^5$ and $k^6$, respectively, which operate to prevent the said rollers from revolving too freely when their respective clutches are not in operation, and the roller G above the roller $a^4$ is provided with a similar spring $k^7$, which is adapted to enter a notch or recess in the end of the roller G at the same time that arm $g^5$ engages with the notch or recess $g^3$ in the disk $g^2$.

Mounted on a short shaft H is a lever $h$, which projects across the box or frame and is provided at its free end with an upwardly-directed arm $h^2$, which is adapted to operate as a stop for the fly $f^7$, and mounted below the lever $h$ is an electromagnet $h^3$, the armature $h^4$ of which is secured to the lever $h$, and in the upper part of the box or casing is another electromagnet $h^5$, the core $h^6$ of which projects thereunder, and the lever $h$ is provided with an upwardly-directed arm $h^7$, to the upper end of which is secured an armature $h^8$, which operates in connection with said magnet.

In Fig. 1 we have shown a section of a cable-conduit at M and a part of the cable $m$, and secured to the bottom of the car is the usual grip-arm $m^2$, and secured to the front edge of the grip-arm by means of a plate $m^3$ is our improved electric switch, which consists of a circular plate $m^4$, on the under side of which are two segmental plates $m^5$ and $m^6$, the ends of which are beveled, as shown at $m^7$, and projecting downwardly centrally of the plate $m^4$ is a rod $m^8$, (this construction being best shown in Figs. 1, 5, 6, 7, and 8,) and mounted on the upper end of the rod $m^8$ is a switch-bar N, which is normally held pressed against an insulating-plate $n$, secured to the bottom of the plate $m^4$ by a tubular sleeve or band $n^2$, mounted on said rod $m^8$ and supported by a spring $n^3$, the lower end of which is supported by a pin $n^4$.

The sleeve or band $n^2$ is provided with a vertical slot $n^5$, through which projects a pin $n^6$, which is secured to the rod $m^8$, and formed on the lower end of said rod is an arm $n^7$, to the opposite sides of which are secured vertical springs $n^8$, which project upwardly on each side of the pin $n^6$ and on each side of the switch-bar N, and the object of the pin $n^6$ is to regulate or limit the downward movement of the switch-bar N and to prevent the springs $n^8$ from moving too far laterally.

The normal position of the switch-bar N is that shown in full lines in Figs. 1, 6, and 8, and secured to the opposite sides of the plate $m^4$, directly over the ends thereof, by means of binding-posts O and $O^2$, are contact-plates $O^3$ and $O^4$. Provided, respectively, with metal blocks $O^5$ and $O^6$, which are adapted to bear on the switch-bar N, are conducting-wires $O^7$ and $O^8$, and these wires are connected with the electromagnet $h^5$, and in the circuit thus formed is a battery $O^9$, and in the normal position of the parts this circuit is always closed, and is broken only when the switch-bar N is moved in the operation of the apparatus, as hereinafter described.

The binding-posts O and $O^2$ and the contact-plates $O^3$ and $O^4$ are insulated from the plate $m^4$, and connected with said plate and insulated therefrom are binding-posts P and $P^2$, which pass through said plate and connect with the segmental plates $m^5$ and $m^6$, and connected with the binding-posts P and $P^2$ are conducting-wires $P^3$ and $P^4$, which lead to and connect with the magnet $h^5$, and in the circuit thus formed is a battery $P^5$, and the circuit thus formed is normally open and is closed only when the other circuit is opened.

We also provide an electric alarm R, of any preferred construction, which is secured to the box or casing A and in circuit with the magnet $h^5$ by means of conductors $R^2$, which connect with the conductors $P^3$ and $P^4$, and the alarm is therefore operated each time that the magnet $h^5$ is actuated, as hereinafter described.

When the switch is carried by a grip-arm, as shown in Figs. 1 and 5, a pin $R^4$ is secured in the top or cover of the conduit and projects downwardly, so as to operate the switch N, and one of these pins is placed wherever it is desired to operate the indicator. When the car reaches the pin $R^4$, the switch-bar N is operated thereby, and the circuit in which the magnet $h^3$ is placed is momentarily broken and the circuit in which the magnet $h^5$ is placed is momentarily closed, and this operation raises the lever $h$, which bears against the under side of and raises the rod K, which in turn raises the rod $g^9$, thus operating shafts $k$ and $g^6$, which operation releases the rod $g^5$ from the disk $g^2$ on the shaft of the roller G and also the rod $g^7$ from the fly $f^7$, and at the same time the rod $k^2$ is moved from the position shown in dotted lines in Figs. 2 and 15 into that shown in full lines in said figures, and when the lever $h$ drops back into normal position and releases the fly the rod $k^2$ cannot return to its normal position until the pinion $e^7$ and wheel $e^9$ have made a partial revolution. Rod $k^2$, being engaged with the worm-gear on the hub F of the wheel $e^9$, also holds rods K and $g^9$ in the raised position, and also holds the rods $g^5$ and $g^7$ out of engagement with the disk $g^2$ and the fly $f^7$ until the wheel $e^9$ has made a partial revolution, when the rod is returned to the position shown in dotted lines in Figs. 2 and 15.

During the partial revolution of the wheel $e^9$, above described, the switch-bar N has been returned to its normal position by the springs $n^8$, the circuit in which the magnet $h^5$ is placed is broken, the other circuit closed, and the lever $h$ attracted by the magnet $h^3$, and the apparatus continues to operate until the roller G makes a complete revolution, when the rod $g^5$ engages with the notch or recess in the disk $g^2$ and the rod $g^7$ with the fly $f^7$, when the mechanism will be stopped. It will be understood that this operation is repeated at each station, and at the end of the line the bar C is operated, as hereinbefore described, so as to reverse the direction of the movement of the rollers $a^4$ and $a^5$.

Under certain circumstances the magnet $h^3$ and the circuit in which it is placed are not necessary, and particularly is this true when the indicator is employed on a trolley-car, and in such cases we employ other devices to hold the lever $h$ in its normal position. These devices consist of an arm $R^5$, secured to the frame $b^7$ and projecting toward the arm which supports the armature $h^8$, and a lever $R^6$, pivoted to said arm, the lower end of which rests on a shoulder or projection formed on the lever $h$, as shown at $R^7$ in dotted lines in Fig. 2, and the upper end of which is provided with an armature $R^8$, which operates in connection with the magnet $h^5$. Said upper end of the lever $R^6$ is provided with a spring $R^9$, which normally holds the armature $R^8$ out of connection with said magnet, all these parts being shown in dotted lines in Fig. 2. In this form of construction the completion of the circuit through the magnet $h^5$, as hereinbefore described, attracts the armature $R^8$ and the upper end of the lever $R^6$ and releases the lower end of said lever from the shoulder or projection $R^7$ on the lever $h$, and the operation will be the same as hereinbefore described.

In Figs. 10, 11, and 13 we have shown the method of operating our indicator on a trolley-car, and in this case the indicator is mounted in the car, as hereinbefore described, and the trolley-arm T supports at its upper end, in addition to the usual trolley $T^2$, side boxes or cases $T^3$, which are secured to the sides of the trolley-fork, and said boxes or cases are provided with circular openings $T^4$ in their outer sides, in which are mounted semispherical heads $T^5$, the convex sides of which are directed outwardly, and mounted centrally on the inner sides of the boxes $T^3$ are projecting pins $T^6$, which project into central cavities or recesses $T^7$, formed in the semispherical heads $T^5$, and mounted on the pins $T^6$ are springs $T^8$, which force said heads outwardly. Mounted in each of the boxes $T^3$ and around the pins $T^6$ are insulated bands or rings $r$, in which the springs $T^8$ are placed, and connected with the heads $T^5$ are spring contact-arms $r^2$, which are in electrical connection with each other and which are adapted to make contact with the bands or rings $r$ when the heads $T^5$ are forced inwardly. The insulated bands or rings $r$ are connected by a wire $r^3$, and the spring-arms $r^2$ are provided with wires or conductors $P^3$ and $P^4$, which correspond with wires $P^3$ and $P^4$, hereinbefore described, and connected with the switch shown in Figs. 6, 7, and 8, also in Fig. 1 and at S in Fig. 5.

It will be understood that the conductors $P^3$ and $P^4$ are in circuit with the magnet $h^5$, and in the circuit thus formed is a battery $r^4$, as shown in Fig. 10.

In Fig. 11 we have shown the device for operating the heads $T^5$ and for closing the circuit, the device shown in Fig. 13 constituting a switch or a circuit making and breaking device, as will be understood. The device referred to for operating the heads $T^5$ consists of an oblong box $r^5$, which is supported in any desired manner, and the bottom of which is open longitudinally to allow for the passage of the trolley-support, and the sides of said box are inwardly curved or convex, as shown at $r^6$ in Figs. 10 and 11, and the ends thereof are wide enough to admit the boxes $T^3$, secured to the sides of the trolley. The top of the box $r^5$ is preferably open, but may be closed, if desired, and as the trolley and the boxes $T^3$ pass therethrough the inwardly-curved sides thereof force the heads $T^5$ inwardly and force the arms $r^2$ into contact with the rings or bands $r$, thus completing the circuit through the magnet $h^5$, and the operation of the indicator will be the same as hereinbefore described.

In Fig. 9 we have shown our improved station-indicator as applied or used in a steam-car, and in this case the switch hereinbefore described and shown in Figs. 6, 7, and 8 on an enlarged scale is indicated by the reference-numeral S, and is supported by a plate or bar $S^2$, which is pivoted to the top of the car, so that the switch may be operated from either side of the track, and in this case the switch-bar N is operated by an arm $S^3$, secured to a post or other support $S^4$, one of which is placed along the track at or adjacent to all stations or wherever it is desired that the indicator should be operated.

The switch is also indicated in Figs. 5 and 12 by the letter S, and in Fig. 12 we have shown the method of operating our station-indicator when applied to an elevated railway. In this case the switch S is secured to the bottom of the car or truck and preferably centrally thereof, and the pin $R^4$, by which the switch-bar is operated, is secured to a tie or other suitable support and projects upwardly. It will be understood that the switch in this case is provided with conductors, the same as in Figs. 6 and 7, and that the magnets $h^3$ and $h^5$ are employed and the operation will be the same as hereinbefore described.

In our improvement the indicator-box is provided with an opening on both sides, and the names of the stations are placed on opposite sides of the strip $g$, and may thus be seen from either side of the box or indicator. In the drawings, however, we have substituted numbers for names, but this is only for the purposes of illustration, and it will be understood that many changes in and modifications of the construction herein shown and described may be made without departing from the spirit of our invention or sacrificing its advantages.

Having fully described our invention, we claim as new and desire to secure by Letters Patent—

1. In combination the casing, the main and guide rollers, the spring-operated gearing, the fly driven from said gearing, the double-armed detent having one arm in proximity to the fly and the other arm riding upon the periphery of one of the rollers and adapted to enter a recess therein to permit the other arm to engage the fly, the armature having connections for moving said detent to release the fly, the electromagnet with electrical connections thereto and means for preventing immediate return of the detent to normal position, substantially as described.

2. In combination the casing, the main and guide rollers, the spring-operated gearing for driving the rollers, the fly operated from said gearing, the detent adapted to normally engage the fly and the arm connected to the detent and adapted to bear on one of the rollers and enter a recess therein, the lever carrying an armature and adapted to disengage the detent from the fly, means for normally locking said lever against movement and for releasing it at certain intervals, and the magnet with electric connections thereto for operating the lever to release the parts, substantially as described.

3. In combination the casing, the ribbon-carrying rollers journaled therein the spring-operated gearing for driving the same, the detent for normally holding said parts against movement, a locking arm or lever for operating said detent, an electromagnet normally in closed circuit for holding said arm or lever against movement, a second magnet in a normally open circuit for operating said lever, and an electric switch for simultaneously breaking the closed circuit and completing the open circuit, substantially as described.

4. In combination, the casing, the ribbon-carrying rollers, the spring-operated gearing for driving the same, the supplemental gearing operated from the main gearing, the fly operated by said supplemental gearing, the detent for engaging the fly to normally hold it against movement, the electromagnet with electric connections for energizing it, the armature adapted to disengage the detent from the fly, and the means for preventing the immediate reëngagement thereof, comprising the worm operated by the supplemental gearing, the spring-arm adapted to engage said worm, means whereby the movement of the armature will throw the spring-arm upon the worm and means whereby the said arm will hold the detent from reëngagement with the fly until the rotation of the worm lowers said spring-arm, substantially as described.

5. In a station-indicator constructed as herein described, an electrical switch consisting of a main disk or plate, segmental plates secured to the one side thereof, and insulated therefrom; a spring-supported and spring-operated switch-bar mounted between said segmental plates and adapted to be turned so as to contact therewith; and binding-posts secured to said disk or plate, and insulated therefrom, and provided with contact devices which bear upon the ends of the switch-bar when the latter is in its normal position, and said plate or disk being also provided with binding-posts which connect with said segmental plates, substantially as shown and described.

6. In a station-indicator for cars constructed as herein described, the combination with a suitable box or casing having side openings, of two ribbon-operating rollers mounted therein adjacent to said openings, means for driving said rollers, including a main spring-operated drive-wheel geared in connection with said rollers, a pinion operated by said drive-wheel, a suitable fly or stop geared in connection with said pinion, a lever pivotally supported and provided with an arm adapted to operate in connection with said fly or stop, two electromagnets, one above and the other below said lever, each of which is provided with an armature connected with said lever, an electric switch carried by said car outside thereof, and two electric circuits between said switch and said magnets, each of which is provided with a battery, said switch being adapted to be operated substantially as shown and described.

7. A station-indicator for cars, comprising a suitable box having openings therein, two spring-operated rollers mounted therein adjacent to said openings, and means for reversing the direction of the movement of said spring-rollers comprising a revoluble clutch-wheel mounted on the shaft of each, a spring-operated sliding clutch-head mounted on the shaft of each and adapted to operate in connection with said clutch-wheels, and a device for alternately connecting and disconnecting said clutch-head from said clutch-wheels, consisting of a movable bar which extends from the shaft of one of said rollers to the other, and which is provided with a yoke at each end, the sides of which pass between the clutch-wheels and the clutch-heads, said sides being wedge-shaped in form, and a lever connected with said bar and adapted to be operated substantially as shown and described.

8. A station-indicator for cars, comprising a suitable box or casing, two ribbon-operating rollers mounted therein, on which are placed a flexible ribbon provided with the names of the stations, guide-rollers mounted in said box or casing near the top and bottom thereof, and from which said flexible strip is passed, a main spring-operated drive-wheel geared in connection with said ribbon-operating rollers, a pinion operated by said drive-wheel, a suitable fly or stop geared in connection with said pinion, suitable stop devices which are adapted to operate in connection with one of said guide-rollers, and with said fly, and means for operating said parts substantially as shown and described.

9. A station-indicator for cars, comprising a suitable box or casing, two ribbon-operating rollers mounted therein, devices for reversing the direction of the movement of said rollers when desired, two suitable guide-rollers, one of which is mounted in the upper, and the other in the lower part of the box or casing, a flexible strip wound on one of the spring-rollers and adapted to be rewound on the other and passed over said guide-rollers, a main spring-operated drive-wheel geared in connection with said ribbon-operating rollers, means connected therewith and with a frame in the box or casing for starting and stopping said ribbon-operating rollers whenever desired, and electrical devices for operating the same, said electrical devices being connected therewith and with the car, and operated by a switch or other circuit closing and breaking device carried by the car outside thereof, substantially as shown and described.

10. An electrical switch, consisting of a main disk or plate, segmental plates secured to one side thereof and insulated therefrom, a spring-supported and spring-operated switch-bar mounted between said segmental plates and insulated from said main disk or plate, said switch-bar being adapted to be turned so as to form a contact with said segmental plates, binding-posts secured to said main disk or plate, and insulated therefrom and provided with contact devices which bear upon the ends of said switch-bar when the latter is in its normal position, said main disk or plate being also provided with other binding-posts which are in connection with said segmental plates, said parts being constructed, combined and arranged substantially as shown and described.

In witness whereof we have hereunto set our hands in presence of two witnesses.

HENRY W. LANGSCHMIDT.
RICHARD F. LE BROCQ.

Witnesses:
WM. WALLACE WHITE,
H. L. BEIL.